3,260,570
Patented July 12, 1966

3,260,570
PROCESS OF OXIDATION OF ORGANIC COMPOUNDS WITH MOLECULAR OXYGEN
Glen A. Russell, % Dept. of Chemistry, Iowa State University, Ames, Iowa
No Drawing. Filed June 21, 1962, Ser. No. 204,032
8 Claims. (Cl. 23—184)

The present invention relates to processes of oxidizing or dehydrogenating organic compounds including hydrocarbons, by reaction with molecular oxygen in the presence of bases or alkali-metal alkoxides. It is directed particularly to liquid-phase oxidation processes which include dimethyl sulfoxide as a solvent and essential component of the reaction medium.

The principal object of the present invention is to provide a simple process for the oxidation of organic compounds with molecular oxygen or air that can be conducted under relatively mild but controllable reaction conditions, which is capable of producing the desired oxidation products at a high reaction velocity, and consequently in a short reaction period, and often in a substantially quantitative yield, without the production of substantial amounts of undesired oxidation products or other by-products. Other objects and advantages of the invention, some of which are referred to hereinafter, will be obvious to those skilled in the art to which it pertains.

In accordance with the oxidation processes of the present invention, a solution in dimethyl sulfoxide of the organic compound to be oxidized, which contains a substantial proportion of an alkali metal oxide, hydroxide, or alkoxide, such as potassium tertiary butoxide, potassium hydroxide, sodium ethoxide, or lithium methoxide, at a temperature between approximately —20° and approximately 100° C., is shaken with air or molecular oxygen, or alternatively, air or molecular oxygen is distributed throughout the solution. Dimethyl sulfoxide has been found to be an especially suitable and useful solvent or reaction medium in which to conduct such oxidation or dehydrogenation reactions with molecular oxygen. It has been found that, although dimethyl sulfoxide is unstable and has a tendency to decompose in the presence of alkali-metal alkoxides and molecular oxygen, such decomposition can be inhibited or suppressed by tertiary butyl alcohol in proportions between 10 and 20 parts by volume to between 90 and 80 parts by volume of dimethyl sulfoxide.

The oxidation processes of the present invention are believed to be ionic processes which involve the interreaction of a carbanion. For oxidation to occur, the organic compound must be capable of undergoing ionization in the presence of the basic catalyst. Dimethyl sulfoxide is a unique solvent in bringing about such ionizations.

Many hydrocarbons which are not readily ionized into carbanions (which are negative groups containing a carbon atom that has an unshared pair of electrons) by alkoxide ions in solvents such as alcohol, pyridine, piperidine, benzene, and 1,2-dimethoxyethane, are ionized and oxidized much more readily in solution in dimethyl sulfoxide and in mixtures of dimethyl sulfoxide and tertiary butyl alcohol. Triphenylmethane is thus oxidized to triphenylcarbinol, diphenylmethane to benzhydrol or benzophenone, xanthene to xanthone, and p-cyanotoluene, di-p-tolylsulfone, p-phenylsulfonyltoluene, and methyl p-toluate to their corresponding para-substituted acids or stilbene derivatives in such a mixture of dimethyl sulfoxide and tertiary butyl alcohol. Aliphatic ketones and nitriles are also readily oxidized in dimethyl sulfoxide solution. Small amounts of dimethyl sulfoxide, of the order of 10 percent, for example, when added to systems containing tertiary butyl alcohol and alkali metal tertiary butoxides, were found to produce a pronounced increase in the rate of oxidation with molecular oxygen of hydrocarbons such as fluorene, which is only difficultly ionizable.

In comparative tests with potassium tertiary butoxide in various solvents, it was found that diphenylmethane was oxidized with molecular oxygen in a solvent consisting of 80 parts by volume of dimethyl sulfoxide and 20 parts by volume of tertiary butyl alcohol, whereas no oxidation occurred when tertiary butyl alcohol, benzene, 1,2-dimethoxyethane, or pyridine were the sole solvents. Similar results were observed when p-nitrocumene was subjected to such treatment in these solvents, whereas p-nitrotoluene was oxidized in each of these solvents, and toluene was oxidized in none at 30° C., not even in a mixture of dimethyl sulfoxide and tertiary butyl alcohol. Most of the compounds whose oxidations are described in the specific examples herein are not capable of being oxidized in systems composed of respectively water and hydroxyl ions, alkanols and alkoxide ions, pyridine and alkoxide ions, benzene and potassium alkoxides and dioxane and potassium alkoxides.

In a preferred embodiment of the oxidation processes of this invention, the compound to be oxidized is dissolved in a mixture of dimethyl sulfoxide (80 parts by volume) and tertiary butyl alcohol (20 parts by volume) containing a strong base, such as potassium tertiary butoxide, in an amount between 0.1 and 3.0 molecular equivalents of the base to each mole of the organic compound. This solution is then rapidly stirred or shaken in an atmosphere of oxygen or air contained in an open or a closed container.

A convenient laboratory procedure for small-scale preparations in accordance with the processes of this invention comprises adding the organic compound to be oxidized to a solution of potassium tertiary butoxide or other base in the reaction solvent, for example, a mixture of 80 parts by volume of dimethyl sulfoxide and 20 parts by volume of tertiary butyl alcohol, that is contained in a pressure bottle or an ordinary glass flask provided with a rubber septum or stopper. Molecular oxygen is charged into the bottle or flask before it is sealed with the rubber septum to displace the air above the solution. A hypodermic syringe equipped with a hollow needle for piercing the rubber septum is used for adding the organic compound to the reaction mixture. Organic compounds that are to be oxidized may be conveniently dispensed from such a hypodermic syringe in the form of solutions in the solvent or solvent mixture in which the reaction is to be conducted. After the addition of the organic substance to be oxidized, the bottle and its contents is shaken periodically to facilitate distribution and absorption of the oxygen by the liquid mixture. The course of the reaction can be followed by observing the pressure drop in the bottle, when operating at superatmospheric pressure, or, alternatively, by maintaining the pressure in the bottle constant by use of a gas burette and pressure-controlling device and measuring the volume of oxygen absorbed.

After adequate oxygen has been consumed or absorbed as indicated by a decrease in gas pressure at constant volume, or a decrease in gas volume at a constant pressure, the desired product is recovered and further isolated from the reaction mixture by conventional procedures, many of which are described specifically in the examples that follow. In many cases the oxidation products can be recovered by simple filtration of the reaction mixture. It is often advisable to first acidify the reaction mixture with an aqueous mineral acid and to isolate the reaction product either by filtration or by extraction with an organic solvent from which the reaction product can be easily obtained.

Air is equally as suitable as molecular oxygen as a source of oxygen. Molecular oxygen was used in the examples which follow simply for convenience and to avoid any possible side reaction that might result from other constituents of air, for example, from small amounts of carbon dioxide and water that might be present.

The oxidation is generally conducted at temperatures not in excess of 100° C. and may be conducted at temperatures as low as −20° C. A short induction period may be observed in certain cases. A wide variety of organic compounds can be oxidized or dehydrogenated in accordance with the processes of this invention. Highly unreactive nonionizable aliphatic hydrocarbons are normally not capable of being oxidized by the methods described herein, although the methods are applicable to the oxidation of methyl-substituted aromatic compounds, including hydrocarbons.

The processes of the invention are applicable to the oxidation or dehydrogenation of at least all of the following general classes of organic compounds to produce products such as specified:

(1) Diarylmethanes and triarylmethanes to produce carbinols or ketones or intermediate compounds containing combined dimethyl sulfoxide. These oxidations can be represented by the following schemes in which Ar represents an aryl radical:

$Ar_3CH + O_2 \longrightarrow Ar_3COH$

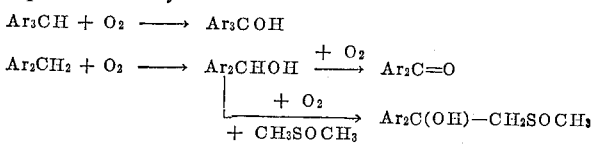

(2) Monoarylmethanes, the aryl radical of which is substituted in the para position by a radical of the group consisting of nitro, alkoxycarbonyl, aryloxycarbonyl, alkylsulfonyl, arylsulfonyl, alkylazo, arylazo, acyl, aroyl, and cyano radicals to produce either or both of substituted arylcarboxylic acids and disubstituted diarylethylenes. The oxidation of these compounds may be represented by the following scheme, in which Ar is an aryl radical and X is one of the foregoing substituent radicals:

$X-ArCH_3 + O_2 \rightarrow X-ArCH=CHAr-X + X-ArCOOH$ (3) Bis(methylaryl)sulfones, sulfoxides, ketones, and diazo derivatives of the formula:

$CH_3-Ar-Y-Ar-CH_3$ in which Y is a sulfonyl, sulfinyl, carbonyl, or diazo radical and Ar is an aryl radical, to produce oxidation compounds consisting of dibasic acids having the formula $HOOC-Ar-Y-Ar-COOH$, as well as stilbenes having the following formula:

$HOOC-Ar-Y[-Ar-CH=CH-ArY]_n Ar-COOH$ (4) Methyl-substituted pyridines (picolines) and methyl-substituted pyridine oxides to produce nicotinic acids (pyridine carboxylic acids) and pyridine oxide carboxylic acids or the corresponding 1,2-dipyridinylethylenes, which may be represented by the following equation (for 4-methylpyridine oxide):

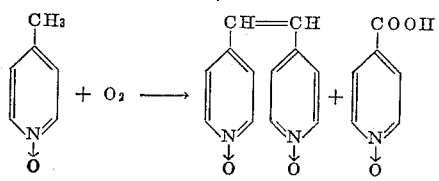

(5) Unsubstituted and ring-substituted primary arylamines, the substituent radicals of which may be a halogen, phenyl, thiophenyl or other radical to produce a diazo compound. These oxidations are represented by the following scheme in which Ar is an aryl radical and X is one of the foregoing substituent radicals:

$X-Ar-NH_2 + O_2 \rightarrow X-Ar-N=N-Ar-X$

Typical methods of practicing the processes of the present invention are described in the examples which follow:

*Example 1*

Molecular oxygen at a pressure of 1 atmosphere was passed into a 100-milliliter flask containing an anhydrous solution of 3.14 millimoles of triphenylmethane in 25 milliliters of a mixture of 20 parts by volume of tertiary butyl alcohol and 80 parts by volume of dimethyl sulfoxide containing 6 millimoles of potassium tertiary butoxide that was maintained at a temperature of 25° C. The flask was sealed and shaken vigorously and the amount of oxygen required to maintain a pressure of 1 atmosphere was measured. After about 20 minutes, 3.2 millimoles of oxygen had been absorbed. Triphenylmethanol was isolated by adding an excess of aqueous hydrochloric acid to the reaction mixture and extracting it with diethyl ether. The yield of triphenylcarbinol which was recovered from the resulting ethereal solution by evaporation and crystallization was equivalent to 3.12 millimoles; its melting point as thus obtained was 163° C.

*Example 2*

By shaking a solution of 3.15 millimoles of diphenylmethane in 25 milliliters of a mixture of 80 parts by volume of dimethyl sulfoxide and 20 parts by volume of tertiary butyl alcohol containing 6 millimoles of lithium tertiary butoxide maintained at a temperature of 25° C. in a sealed bottle with molecular oxygen for a period of 10 minutes, 3.18 millimoles of oxygen were absorbed. The amount of benzophenone thus formed, which was recovered by acidification and extraction, was equivalent to 3.10 millimoles.

When potassium tertiary butoxide was substituted for lithium tertiary butoxide, the product recovered, after an oxidation period of 2 hours and after acidification and extraction, consisted of a compound having the following formula and a melting point of 149–150° C., in a yield equivalent to 2.6 millimoles.

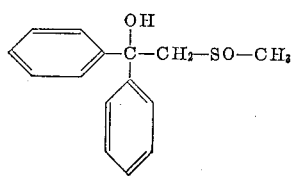

*Example 3*

When a solution of 3.0 millimoles of diphenylmethane in 35 milliliters of the 80–20 mixture of dimethyl sulfoxide and tertiary butyl alcohol containing 15 millimoles of potassium tertiary butoxide was shaken with molecular oxygen for 2 minutes, 3.4 millimoles of oxygen were absorbed. The shaking was continued for a total period of 2 hours, after which the oxygen absorbed amounted to 9.6 millimoles. A yield of 1.9 millimoles of the same addition product of dimethyl sulfoxide and diphenylcarbinol that was obtained in Example 2 hereinbefore was obtained after acidification and extraction of the reaction of the reaction mixture with benzene.

In the presence of only 6.3 millimoles of potassium tertiary butoxide and an absorption period of 30 minutes, at which time 5.1 millimoles of oxygen was absorbed, the product isolated consisted of 1.8 millimoles of diphenylcarbinol (benzohydrol).

*Example 4*

When xanthene in an amount equivalent to 3.16 millimoles was substituted for diphenylmethane in the foregoing Example 3, the solution containing also 6 millimoles of potassium t-butoxide, and the mixture shaken in a sealed bottle with molecular oxygen for 2.5 minutes, 4.2 millimoles of oxygen was absorbed. From the resulting mixture, 2.9 millimoles of xanthone, having a melting point of 172–173° C., were recovered by acidification and extraction as described hereinbefore.

Example 5

A solution containing 3.16 millimoles of fluorene (diphenylenemethane) in 25 milliliters of the 80–20 mixture of dimethyl sulfoxide and tertiary butyl alcohol referred to in the foregoing examples and 6 millimoles of potassium tertiary butoxide was shaken with molecular oxygen in the manner described in the preceding example, absorbing 2.96 millimoles of oxygen in 30 seconds. The product, of which 2.40 millimoles was recovered after acidification and ether extraction, had a melting point of 156–157° C. and had the following formula:

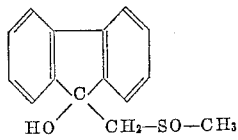

Example 6

A solution containing 3.2 millimoles of methyl p-toluate in 25 milliliters of the 80–20 mixture of dimethyl sulfoxide and tertiary butyl alcohol referred to in the foregoing examples and 6 millimoles of potassium tertiary butoxide, when shaken with molecular oxygen for one hour, absorbed 4.16 millimoles of oxygen. The reaction mixture, which contained a mixture of carboxylic acids and esters, was then hydrolyzed. The acid fraction recovered from this mixture had a neutralization equivalent of 127.4 indicating a mixture of 13 percent terephthalic acid (whose neutralization equivalent is 83) and 87 percent 4,4'-stilbene dicarboxylic acid (whose neutralization equivalent is 134).

From the product of esterification of the foregoing hydrolysis product with methanol, it was possible to isolate 0.30 millimole of dimethyl terephthalate and 2.25 millimoles of the dimethyl ester of 4,4'-stilbene dicarboxylic acid.

Example 7

A solution containing 5.0 millimoles of phenyl-p-tolylsulfone in 40 milliliters of the 80–20 mixture of dimethyl sulfoxide and tertiary butyl alcohol referred to in the preceding examples and 10 millimoles of potassium tertiary butoxide absorbed 12 millimoles of oxygen in 230 minutes when shaken with molecular oxygen as described in preceding examples. When the reaction mixture was added to water, 0.386 gram of an insoluble product, which had a melting point of 326–329° C., precipitated. Analysis of the product revealed a composition consisting of 67.71 percent carbon, 4.68 percent hydrogen and 13.43 percent sulfur, which agrees with an empirical formula of $C_{26}H_{20}O_4S_2$. The nuclear magnetic resonance and infrared spectral date indicate the compound to have the following structural formula:

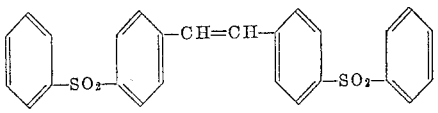

From the aqueous filtrate, 0.690 gram of 4-phenylsulfonylbenzoic acid ($C_6H_5$—$SO_2$—$C_6H_4$—COOH) having a melting point of 273° C. was obtained upon acidification.

Example 8

To a solution containing 5.0 millimoles of phenyl-p-tolylsulfone in 30 milliliters of the 80–20 mixture of dimethyl sulfoxide and tertiary butyl alcohol at a temperature of 250° C. and under an atmosphere of molecular oxygen at a pressure of 740 millimeters of mercury, was added slowly at intervals during a period of 25 minutes, a solution of 10 milliliters of the same 80–20 solvent mixture. This reaction mixture was stirred vigorously for a period of 2 hours, at which time 9 millimoles of oxygen had been absorbed. The products recovered as described hereinafter, consisted of 2.4 millimoles of 4-phenylsulfonyl benzoic acid and 2.4 millimoles of the stilbene derivative whose formula appears in foregoing Example 7.

When the foregoing example was repeated but the reaction mixture was stirred for a longer period (273 minutes) under a pressure of 1 atmosphere of molecular oxygen, 11.2 millimoles of oxygen was absorbed and the products consisted of 1.4 millimoles of the stilbene derivative and 3.1 millimoles of the carboxylic acid.

Example 9

A solution of 3.17 millimoles of di-p-tolylsulfone in 25 milliliters of the 80–20 mixture of dimethyl sulfoxide and tertiary butyl alcohol containing 11 millimoles of potassium tertiary butoxide was treated at 25° C. with molecular oxygen as described in the preceding examples. From the reaction mixture was recovered, by filtration, 0.75 gram of an insoluble substance which had a neutralization equivalent of 680, whose infrared spectral analysis confirmed the absence of aliphatic protons in the product. The product decomposed when heated without melting, and is a mixture of the compound whose neutralization equivalent is 560 having the following formula in which X is —$SO_2$— and $n$ is 1, contaminated with the compound having this formula in which $n$ is 2.

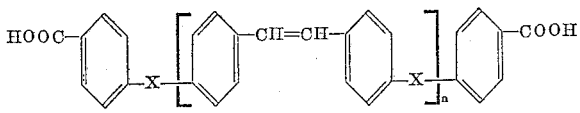

Example 10

When a solution of 3.2 millimoles of di-p-tolyl ketone in 25 milliliters of the 80–20 mixture of dimethyl sulfoxide and tertiary butyl alcohol containing 4.8 millimoles of potassium tertiary butoxide was treated at 25° C. with molecular oxygen as described in the preceding examples, 4.8 millimoles of oxygen was absorbed in 20 minutes. On adding the reaction mixture to hydrochloric acid, 2.85 millimoles of an insoluble acid was obtained that decomposed when heated with melting and had a neutralization equivalent of 560. The product was a mixture containing the compound whose neutralization equivalent is 500 having the formula hereinbefore in Example 9 in which X is —CO— and $n$ is 1, contaminated with small amounts of the compound having that same formula in which X is also —CO— but $n$ is 2.

Example 11

A solution of 3 millimoles of aniline in 25 milliliters of the 80–20 mixture of dimethyl sulfoxide and tertiary butyl alcohol containing 6 millimoles of potassium tertiary butoxide absorbed 3.01 millimoles of oxygen at a pressure of 760 mm. when agitated vigorously for one hour at a temperature of 28° C. as described in the preceding examples. On the addition of water, 2.61 millimoles of azobenzene having a melting point of 67–68° C., was obtained, which is equivalent to a stoichiometric yield of 87%.

Example 12

A solution of 3 millimoles of o-aminobiphenyl in 25 milliliters of the 80–20 mixture of dimethyl sulfoxide and tertiary butyl alcohol containing 6 millimoles of potassium tertiary butoxide when shaken vigorousy in an oxygen atmosphere at a partial pressure of 760 mm. at a temperature of 25° C., as described in the preceding examples, absorbed 4.02 millimoles of oxygen after 54 minutes. Approximately 2.25 millimoles of the relatively impure azo compound (o,o'-diphenylazobenzene) precipitated on the addition of water to the mixture. By chromatography of the crude product on a silica column using benzene-hexane mixtures as eluent, 1.32 millimoles of the pure azo compound, having a melting point of 144–6° C., which is equivalent to 44% of the stoichiometric yield, was recovered.

Example 13

A solution of 3 millimoles of o-chloroaniline in 24 milliliters of the 80–20 mixture of dimethyl sulfoxide and tertiary butyl alcohol containing 6 millimoles of potassium tertiary butoxide, when shaken at 25° C. with oxygen at a pressure of 1 atmosphere, as described in the preceding examples, absorbed 4.02 millimoles of oxygen in 50 minutes. The product which separated upon addition of water to the reaction mixture was the impure azo compound in an amount equivalent to 2.1 millimoles. Upon purification by chromatography on a silica column and elution as described in Example 12, 1.83 millimoles, equivalent to 61% of the stoichiometric yield, of 2,2'-dichloroazobenzene, having a melting point of 137–8° C., was obtained.

Example 14

A solution of 0.595 gram of xanthydrol in 50 milliliters of the 80–20 mixture of dimethyl sulfoxide and tertiary butyl alcohol containing 0.045 mole of rubidium tertiary butoxide at a temperature of 25° C. and a pressure of 760 millimeters, absorbed 145 milliliters of oxygen, which is equivalent to 1.92 moles of oxygen per mole of xanthydrol. A yellow-colored precipitate, weighing 0.35 gram, was separated by filtration.

The resulting filtrate contained 0.5682 gram of xanthone in solution, which was isolated by addition of the filtrate to water. The melting point of the xanthone that was thus recovered was 175–175.5° C.

This oxidation is represented by the following equation:

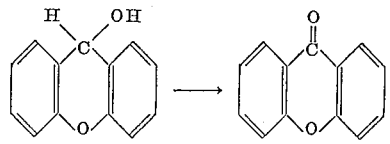

The yellow-colored precipitate that was recovered by filtration was essentially pure rubidium superoxide. It reacted vigorously when dropped into ice water; its elemental analysis corresponded to a formula of $RbO_{1.95}$ (equivalent to 95% $RbO_2$ and 5% $Rb_2O_2$) and it conformed in other respects with the known rubidium superoxide having the formula $RbO_2$.

Example 15

When cesium tertiary butoxide was substituted for rubidium tertiary butoxide and the xanthydrol otherwise treated as described in Example 14, 1.94 moles of oxygen was absorbed for each mole of xanthydrol and the superoxide precipitate contained 1.93 moles of oxygen per mole of the xanthydrol present in the reaction mixture. Elemental analysis of the precipitate corresponded to the formula $CsO_{1.94}$ (equivalent to 96% $CsO_2$ and 6% $Cs_2O_2$).

Example 16

When potassium tertiary butoxide was substituted for rubidium tertiary butoxide and the xanthydrol otherwise treated as described in Example 13, 139 milliliters of oxygen at a temperature of 25° C. and a pressure of 740 milliliters corresponding to 1.85 moles of oxygen per mole of xanthydrol, was absorbed. From the reaction mixture were obtained 0.523 gram of xanthone having a melting point of 175° C., and 0.23 gram of a yellow precipitate whose elemental analysis corresponded to a formula of $KO_{1.85}$ (equivalent to 90% $KO_2$ and 10% $K_2O_2$) which conformed in other respects to the known potassium superoxide having the formula $KO_2$.

Although the foregoing examples (14 to 16) illustrate the results that are obtained when potassium, cesium, and rubidium tertiary butoxides are used as bases in the oxidation of xanthydrol, with the concurrent formation of superoxides of alkali metals, similar results are obtained when other diphenylcarbinols are substituted for xanthydrol. Xanthydrol, however, is unique in its effects on the amounts and purities of the alkali metal superoxides that are thus produced. The alkali metal superoxides that are produced in the oxidation of xanthydrol are purer than those produced in the oxidation of other diphenylcarbinols, and their yields are also greater.

The product produced when sodium tertiary butoxide is used in the oxidation of xanthydrol is sodium peroxide ($Na_2O_2$). A sodium superoxide having the formula $NaO_2$ is not known. Cesium superoxide ($CsO_2$), which is a known compound, is concurrently formed when cesium tertiary butoxide is used in the oxidation of xanthydrol, just as are potassium and rubidium superoxides.

The general process described in Examples 13, 14, and 15 affords a convenient method for the production of alkali metal superoxides, which can be used as oxidizing agents, for example, in the formulation of rocket propulsion, or which can be converted to hydrogen peroxide.

Alkali metal superoxides are also produced when other solvents, such as tertiary butyl alcohol, or a mixture of 80 parts by volume of pyridine to 20 parts by volume of tertiary butyl alcohol, are used in place of the 80–20 mixture of dimethyl sulfoxide and tertiary butyl alcohol.

The effects of different solvent reaction media on the oxidation of xanthydrol in a vigorously stirred reaction medium containing 3 moles of potassium tertiary butoxide to each mole of xanthydrol, are illustrated in the following results, which specify the number of moles of oxygen at 25° C. and a pressure of 760 milliliters that are absorbed per minute per mole of xanthydrol.

| Solvent: | Oxygen absorption (mole $O_2$/minute/mole xanthydrol) |
|---|---|
| (1) Tertiary butyl alcohol | 0.095 |
| (2) 80 pyridine–20 tertiary butyl alcohol | 0.150 |
| (3) 80 dimethyl sulfoxide–20 tertiary butyl alcohol | 0.481 |

Inasmuch as the foregoing specification comprises preferred embodiments of the invention which were selected solely for purposes of illustration, it is to be understood that modifications and variations may be made therein in conventional manners to adapt it to commercial and other uses, without departing from the invention, whose scope is limited solely by the appended claims.

What is claimed is:

1. In a process for the oxidation of an organic substance that is susceptible to autoxidation in an alkaline medium by molecular oxygen the improvement which comprises reacting a solution of the said organic substance in a solvent comprising dimethyl sulfoxide with molecular oxygen in the presence of a base and at a temperature between about −20° C. and about 100° C.

2. In a process for the oxidation of an organic substance that is ionizable in dimethyl sulfoxide the improvement comprises reacting the said organic substance with molecular oxygen in a solvent comprising dimethyl sulfoxide in the presence of an alkali metal alkoxide and at a temperature between about −20° C. and about 100° C.

3. In a process for the oxidation of an organic compound that is ionizable in dimethyl sulfoxide the improvement which comprises reacting the said organic substance with molecular oxygen in solution in a solvent mixture consisting of dimethyl sulfoxide and between about 10 and about 20 percent by volume of tertiary butyl alcohol in the presence of an alkali metal tertiary butoxide in an amount between 0.1 and 3.0 molecular equivalents for each mole of the organic compound at a temperature between about −20° C. and approximately 100° C.

4. A process for the oxidation of a polyphenylmethane having at least one ionizable alpha-hydrogen atom which comprises reacting with molecular oxygen a solution of the polyphenylmethane in a solvent mixture consisting essentially of dimethyl sulfoxide containing between about 10 and about 20 percent by volume of tertiary butyl alcohol in the presence of at least an 0.5 molecular equivalent of an alkali metal tertiary butoxide, and subsequently separating and recovering the oxidized polyphenylmethane from the resutling mixture.

5. A process as defined in claim 4 in which the polyphenylmethane is triphenylmethane and the oxidized product that is recovered is triphenylcarbinol.

6. A process for the production of xanthone and of a superoxide of an alkali metal of the group consisting of potassium, rubidium, and cesium which comprises reacting with molecular oxygen a solution containing xanthydrol and a tertiary butoxide of an alkali metal of the said group in tertiary butyl alcohol in the presence of dimethyl sulfoxide, and subsequently separating and recovering the alkali metal superoxide and the xanthone from the resulting mixture.

7. A process for the production of xanthone and of a superoxide of an alkali metal of the group consisting of potassium, rubidium, and cesium which comprises reacting with molecular oxygen a solution containing xanthydrol and a tertiary butoxide of an alkali metal of the said group in a non-aqueous organic solvent comprising between about 90 and about 80 parts by volume of dimethyl sulfoxide with between about 10 and about 20 parts by volume of tertiary butyl alcohol, and subsequently separating and recovering the alkali metal superoxide and the xanthone from the resulting mixture.

8. A process as defined in claim 7 in which the solvent consists essentially of a mixture of 80 parts by volume of dimethyl sulfoxide and 20 parts by volume of tertiary butyl alcohol.

References Cited by the Examiner

UNITED STATES PATENTS 2,908,552  10/1959  Cunningham et al. __ 23—184 X

OSCAR R. VERTIZ, *Primary Examiner.*

MAURICE A. BRINDISI, *Examiner.*

E. STERN, J. J. BROWN, *Assistant Examiners.*